United States Patent
Yang et al.

(10) Patent No.: US 12,179,594 B2
(45) Date of Patent: Dec. 31, 2024

(54) METHOD OF AUTOMATICALLY SWITCHING MANNER OF ANSWERING CALL BETWEEN OPTIONS, AND VEHICLE-MOUNTED SYSTEM APPLYING METHOD

(71) Applicant: Mobile Drive Netherlands B.V., Amsterdam (NL)

(72) Inventors: Cheng-Kuo Yang, New Taipei (TW); Shao-Yang Liu, New Taipei (TW)

(73) Assignee: Mobile Drive Netherlands B.V., Amsterdam (NL)

( * ) Notice: Subject to any disclaimer, the term of this patent is extended or adjusted under 35 U.S.C. 154(b) by 196 days.

(21) Appl. No.: 18/073,866

(22) Filed: Dec. 2, 2022

(65) Prior Publication Data

US 2023/0173920 A1      Jun. 8, 2023

(30) Foreign Application Priority Data

Dec. 3, 2021   (CN) .......................... 202111468055.1

(51) Int. Cl.
| | |
|---|---|
| *B60K 35/60* | (2024.01) |
| *B60K 35/00* | (2006.01) |
| *B60K 35/80* | (2024.01) |
| *G06V 40/16* | (2022.01) |
| *B60K 35/65* | (2024.01) |
| *B60K 35/85* | (2024.01) |

(52) U.S. Cl.
CPC ............ *B60K 35/00* (2013.01); *G06V 40/161* (2022.01); *B60K 35/60* (2024.01); *B60K 35/65* (2024.01); *B60K 35/80* (2024.01); *B60K 35/85* (2024.01); *B60K 2360/563* (2024.01); *B60K 2360/569* (2024.01); *B60K 2360/5911* (2024.01); *B60K 2360/741* (2024.01); *B60K 2360/782* (2024.01)

(58) Field of Classification Search
CPC .. B60K 35/00; B60K 35/65; B60K 2360/569; B60K 2360/563; B60K 35/80; B60K 35/60; B60K 2360/741; B60K 35/85; B60K 2360/782; B60K 2360/5911; G06V 40/161

See application file for complete search history.

(56) References Cited

FOREIGN PATENT DOCUMENTS

| | | |
|---|---|---|
| CN | 104363342 A | 2/2015 |
| CN | 104735261 A | 6/2015 |
| CN | 106953986 A | 7/2017 |
| CN | 107465678 A | 12/2017 |
| CN | 111510886 A | 8/2020 |
| CN | 111885572 A | 11/2020 |

*Primary Examiner* — Mathew Franklin Gordon
(74) *Attorney, Agent, or Firm* — ScienBiziP, P.C.

(57) ABSTRACT

A method of automatically switching between manners of answering calls by vehicle occupants in a vehicle connects a vehicle-mounted system with terminal device of occupant. Information as to persons in the vehicle is detected. Information as to different occupants allows method to recommend one of a first manner, a second manner, and a third manner of responding to an incoming call, the driver being able to select his preferred manner by pushbutton mounted on steering wheel. Driving safety is improved, and privacy of a personal conversation can be maintained. A vehicle-mounted system applying the method is also disclosed.

18 Claims, 6 Drawing Sheets

METHOD OF AUTOMATICALLY SWITCHING MANNER OF ANSWERING CALL BETWEEN OPTIONS, AND VEHICLE-MOUNTED SYSTEM APPLYING METHOD

FIELD

The subject matter herein generally relates to traffic safety.

BACKGROUND

Heavy road traffic makes traffic safety more important. While driving, it is dangerous for driver to answer an incoming call by picking up and holding his telephone device. The vehicle provides an in-vehicle BLUETOOTH module for answering the incoming call, and a privacy of a personal conversation is lost when there are other passengers in the vehicle. A manual switching by the driver to privately respond to the call is not optimal.

Thus, there is room for improvement in the art.

BRIEF DESCRIPTION OF THE FIGURES

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
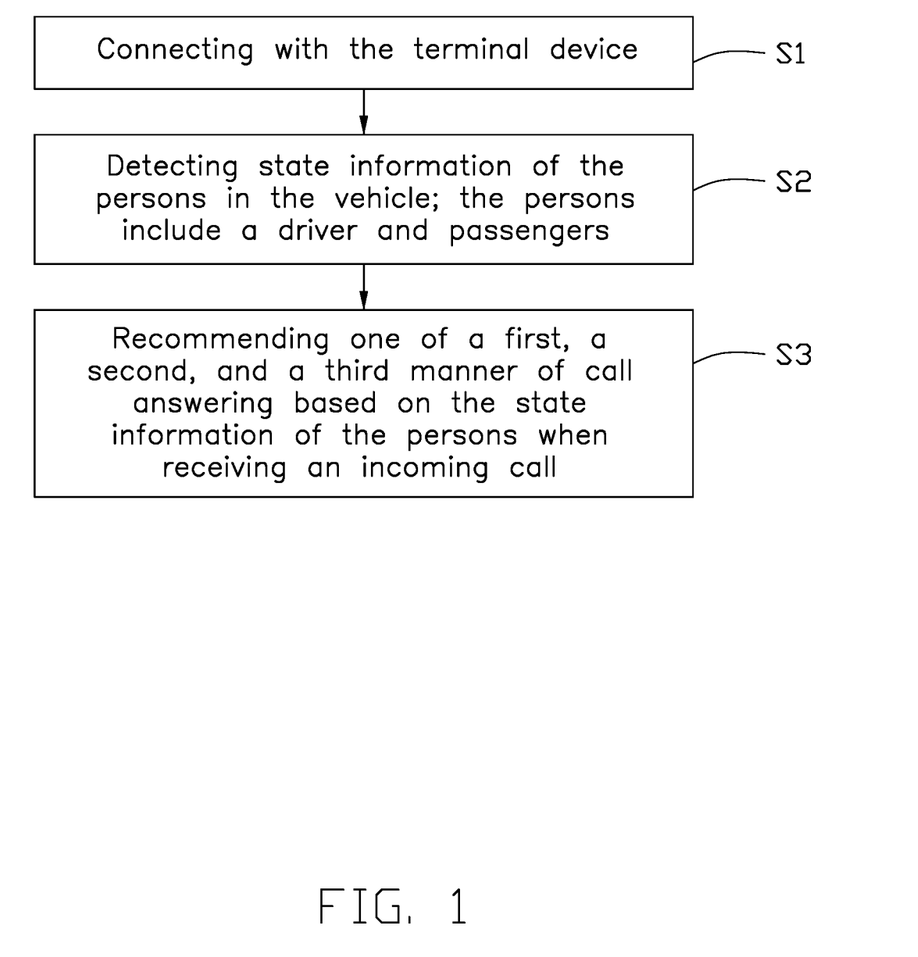
FIG. 1 is a flowchart illustrating an embodiment of a method of automatically switching between manners of answering call according to the present disclosure.

FIG. 1 shows a flowchart of a method of automatically switching between manners of call answering when driving. The method includes the following steps. These steps may be re-ordered.

Figure 2:
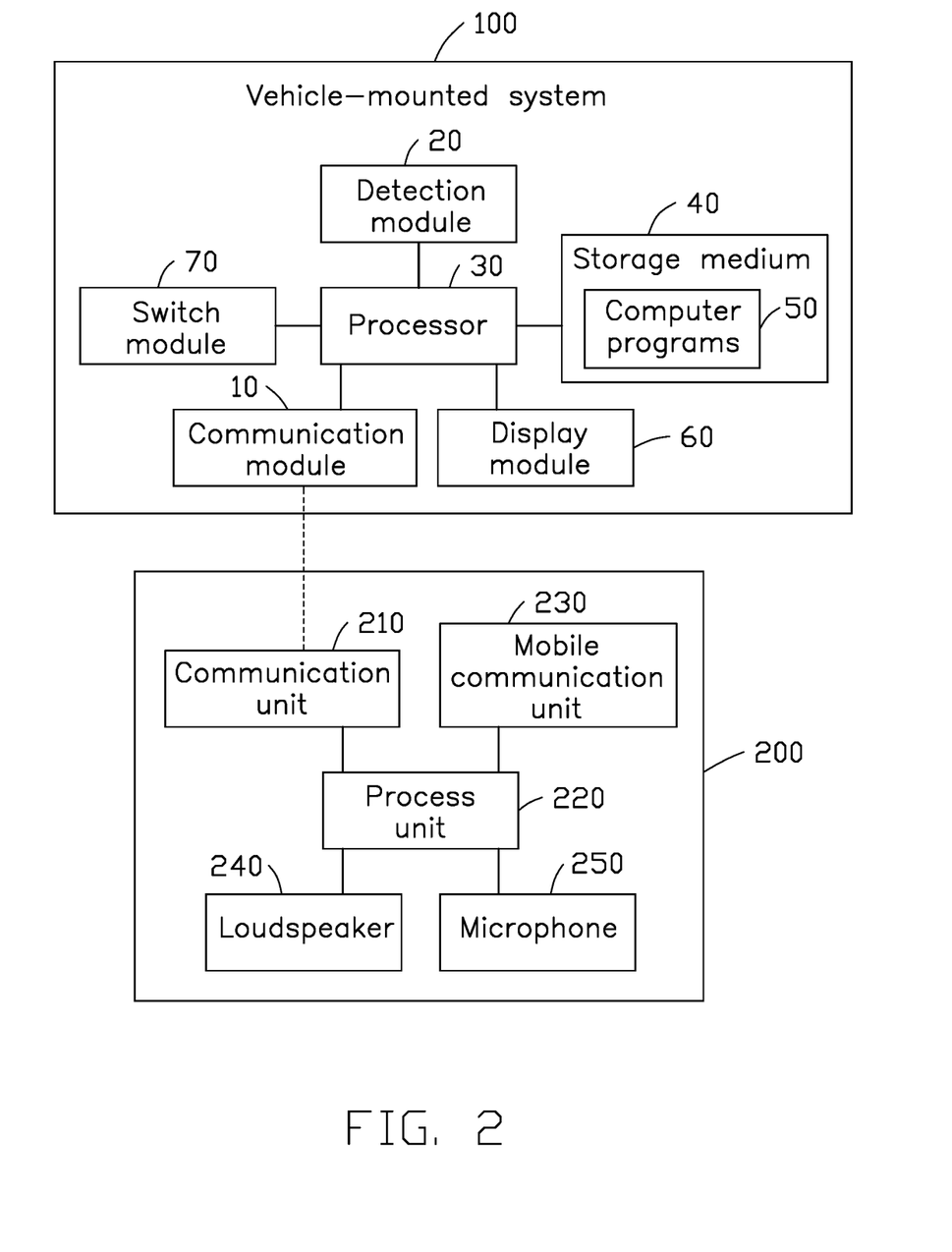
FIG. 2 is a diagram illustrating an embodiment of a vehicle-mounted system according to the present disclosure, the vehicle-mounted system including a display module and a switch module.

In block S1, a terminal device 200 (as shown in FIG. 2) is connected with the vehicle-mounted system 100 (as shown in FIG. 2).

In one embodiment, the terminal device 200 can be a smart terminal device with a call function and a BLUETOOTH function, such as a smart phone, a smart wearable watch, a tablet, not being limited.

In one embodiment, when one or more persons enter into a vehicle through a door and the door is closed, the terminal device 200 of the person is connected with the vehicle-mounted system 100.

In one embodiment, the vehicle-mounted system 100 includes a driver monitoring system (DMS) and/or an occupancy monitoring system (OMS). The DMS and/or OMS can obtains image information of the persons in the vehicle through a camera disposed in the vehicle. Age, sex, number, and behavior of each person are identified based on the image information, thus detections in identification, posture, location, and biometric can be achieved. Thus, the DSM and/or the OMS can monitor the persons in the vehicle.

The vehicle-mounted system 100 determines doors of the vehicle being closed by door locks being electrically connected with the vehicle-mounted system 100.

When the DMS and the OMS monitor the persons in the vehicle and the vehicle-mounted system 100 determines that all the doors are closed, the vehicle-mounted system 100 automatically connects with the terminal device 200 of the persons in the vehicle.

In block S2, state information of persons in the vehicle is detected. The persons can include a driver and passengers.

In one embodiment, the DMS and/or the OMS is used for detecting the state information of the persons.

For example, the DMS and the OMS are electrically connected with sensors in the vehicle (such as an image sensor, an infrared sensor, and a pressure sensor) for obtaining image information from images taken in the vehicle, and/or infrared information of the persons in the vehicle, information of safety belts put on by persons in the vehicle, and/or information of pressure on each seat in the vehicle, thus the state information is detected.

The camera can be disposed on a backrest of a seat in the vehicle. The camera also can be disposed on a rearview mirror. In other embodiments, a camera can be other place due to different requirements, not being limited thereto.

In block S3, one of a first, a second, and a third manner of call answering is recommended based on the state information of the persons when the terminal device 200 receives the incoming call.

In one embodiment, the state information of the persons includes a number of the persons. The block S3 further includes the following steps.

When the number of the persons in the vehicle is one, the vehicle-mounted system 100 recommends the first manner when the terminal device 200 receives the incoming call.

When the number of the persons in the vehicle is more than one, the vehicle-mounted system 100 can recommend any one of the second or third manners when the terminal device 200 receives the incoming call.

In one embodiment, the first manner is an in-vehicle BLUETOOTH manner, the second manner is a wired headset manner, and the third manner is a wireless headset manner.

For example, when the number of the persons in the vehicle is one, the DMS and the OMS obtains the image information, and/or the information of the pressure on a main driver seat in the vehicle, and/or the information of the safety belt of the main driver seat for determining that there is one person in the vehicle. When the terminal device 200 receives the incoming call, the vehicle-mounted system 100 recommends the first manner for answering the incoming call. The vehicle-mounted system 100 connects with the terminal device 200 through an in-vehicle BLUETOOTH communication technology. The person in the vehicle selects the first manner, for answering the incoming call. The safety risks of a driver answering the incoming call by taking hold of his mobile phone while driving are prevented.

When the number of the persons in the vehicle is more than one, the DMS and the OMS obtains the image information, and/or the information of the pressure of the main driver seat in the vehicle, and/or the information of the safety belt of the main driver seat for determining that there is more than one person in the vehicle. When the terminal device 200 receives the incoming call, the vehicle-mounted system 100 can recommend the second or third manner for answering the incoming call.

When the number of the persons in the vehicle is more than one, the vehicle-mounted system 100 preferably connects with the terminal device 200 of the driver. The driver can select the second or third manner for answering the incoming call. Privacy of a personal conversation in front of other passengers is not lost.

In other embodiments, the terminal device 200 and the vehicle-mounted system 100 can communicate with each other through other communication technology, such as ZIGBEE technology or WIFI technology, not being limited thereto.

When the number of the persons is one and the person sits at a passenger seat of the parked vehicle for waiting the driver, a driver may enter into the vehicle that followed, thus the second or the third manner is recommended.

In other embodiments, the block S3 includes the following steps.

When the number of the persons is one and the person sits at a main driver seat, the vehicle-mounted system 100 recommends the first manner for answering the incoming call of the terminal device 200.

When the number of the persons is more than one and the persons sit at passenger seats, the vehicle-mounted system 100 recommends the second or third manner for answering the incoming call of the terminal device 200.

For example, the number of persons in the vehicle is one, and the DMS and the OMS obtains the image information, and/or the information of pressure of the main driver seat in the vehicle, and/or the information of safety belt put on by the driver, it can determine there is one person sitting at the passenger seat. When the terminal device 200 receives the incoming call, the vehicle-mounted system 100 can recommend the second or third manner for answering the incoming call. Thus, a privacy of a personal conversation is again protected.

When the third manner is selected, the terminal device 200 connects with a wireless communication device for receiving the incoming call.

In some embodiments, the wireless communication device is a wireless handset.

In some embodiments, before the block S1, the method further detects facial image information of the person at the main driver seat and automatically connects with the terminal device 200 based on the facial image information of the person at the main driver seat.

For example, the vehicle-mounted system 100 pre-stores facial image information of the person A and a record of the terminal device 200 of the person A, and facial image information of the person B and a record of the terminal device 200 of the person B. When persons A and B enter into the vehicle at the same time, and the person A sits at the main driver seat, the facial image information of the person A is obtained by the DMS and the DMS and an automatic connection with the terminal device 200 of the person A is made.

When there is no driver in the parked vehicle, the vehicle-mounted system 100 firstly connects with the terminal device 200 of the passenger sitting in the parked vehicle. When the driver enters into the vehicle and the terminal device 200 of the passenger hung up the incoming call, the vehicle-mounted system 100 disconnects with the terminal device 200 of the passenger and connects with the terminal device 200 of the driver.

The above method optimizes the manner of answering calls, the recommendation by the method is based on the state information of the persons in the vehicle. A safety of driving can be effectively protected, and a privacy of personal conversation is protected. The manner can be automatically switched based on the state information of the persons in the vehicle, and it is more convenient.

FIG. 2 shows a vehicle-mounted system 100. The vehicle-mounted system 100 includes a communication module 10, a detection module 20, and a processor 30.

The communication module 10 communicates with the terminal device 200. The communication module 10 can be a BLUETOOTH communication module, a WIFI communication module, a ZIGBEE communication module, and the like.

The detection module 20 detects the state information of the persons in the vehicle. The persons include a driver and passengers. The detection module 20 includes a plurality of sensors, such as an image sensor, an infrared sensor, a pressure sensor, and the like. The sensors are used for obtaining images in the vehicle, and/or infrared information of the persons in the vehicle, and/or information of safety belts put on by persons in the vehicle, and/or information of pressures on the seats in the vehicle, for detecting the state information of the persons in the vehicle. The detection module 20 sends the state information to the processor 30.

The processor 30 recommends one of the first to third manners of call answering based on the state information of the persons in the vehicle when the terminal device 200 receives the incoming call.

In one embodiment, the vehicle-mounted system 100 further includes a display module 60. The display module 60 display icons corresponding to the first to third manners of call answering.

The terminal device 200 can be a smart phone, a smart wearable watch, a tablet, not being limited. The terminal device 200 includes a communication unit 210, a process unit 220, a mobile communication unit 230, loudspeakers 240, microphones 250, and the like.

The communication unit 210 communicates with the communication module 10. The communication unit 210 can be a BLUETOOTH communication module, a WIFI communication module, a ZIGBEE communication module, and the like.

The mobile communication unit 230 is coupled with an antenna (not shown) of the terminal device 200 for communicating with other devices through a 2G/3G/4G/5G communication technology.

The loudspeaker 240 converts electrical signals into sound. The microphone 250 collects sound and converts the collected sound into the electronic signals for wirelessly transmitting.

The process unit 220 is electrically connected with the communication unit 210, the mobile communication unit 230, the loudspeaker 240, and the microphone 250, and the like. The process unit 220 controls the above units to cooperate with each other when receiving the incoming call.

Figure 3A:
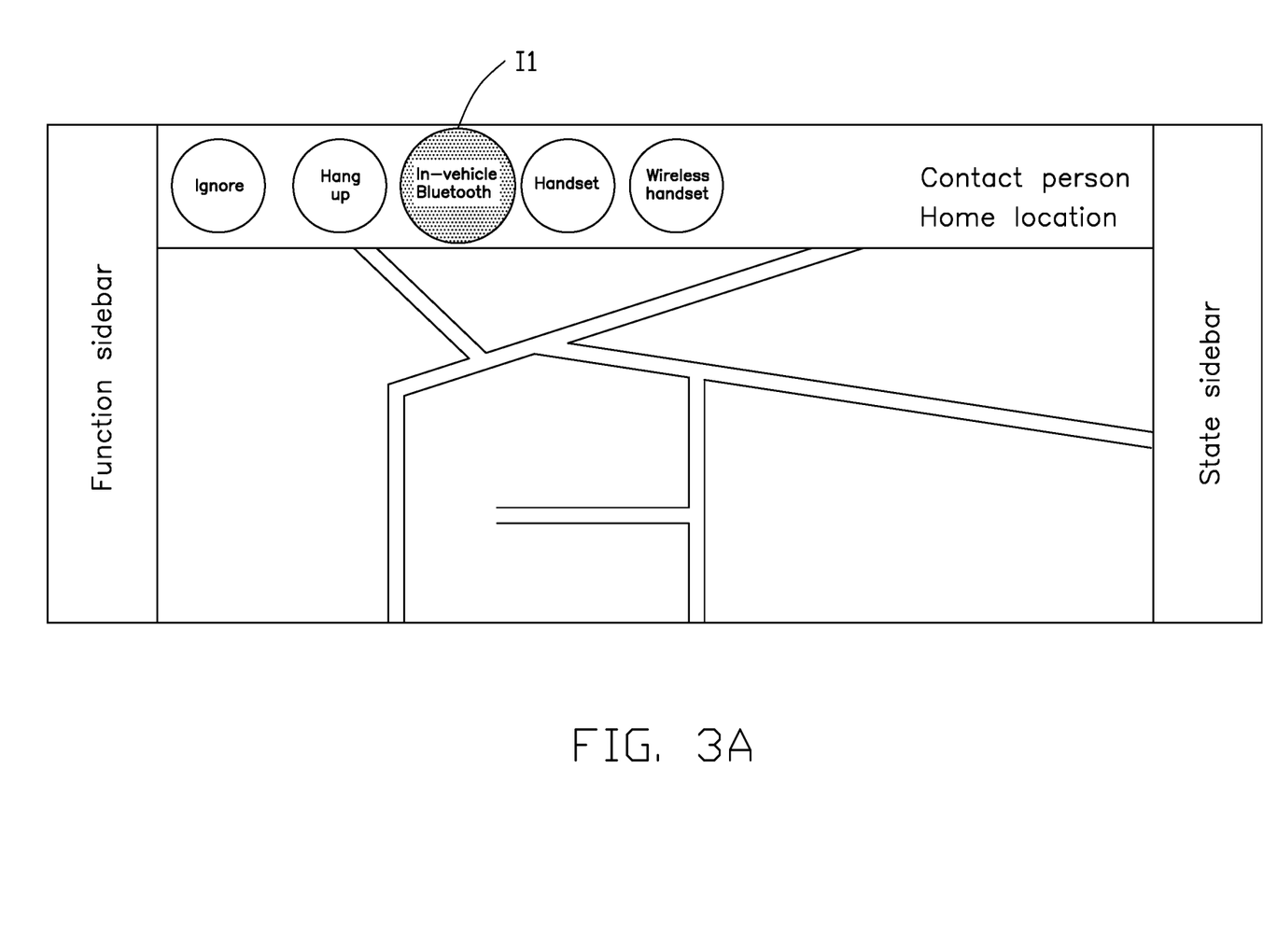
FIG. 3A is a diagram illustrating an embodiment of the display module of FIG. 2 under a first manner of call answering according to the present disclosure.
Figure 3B:
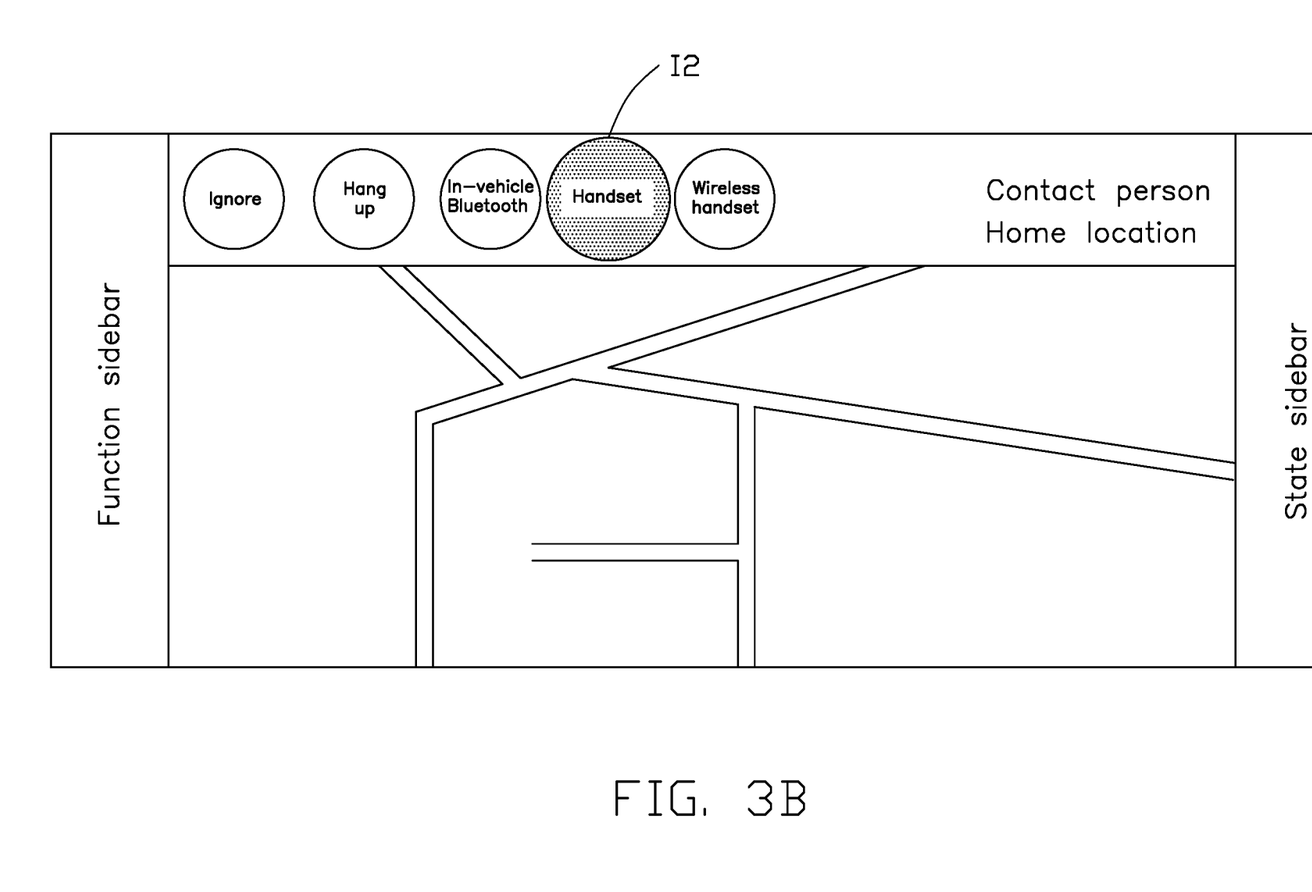
FIG. 3B is a diagram illustrating an embodiment of the display module of FIG. 2 under a second manner of call answering according to the present disclosure.
Figure 3C:
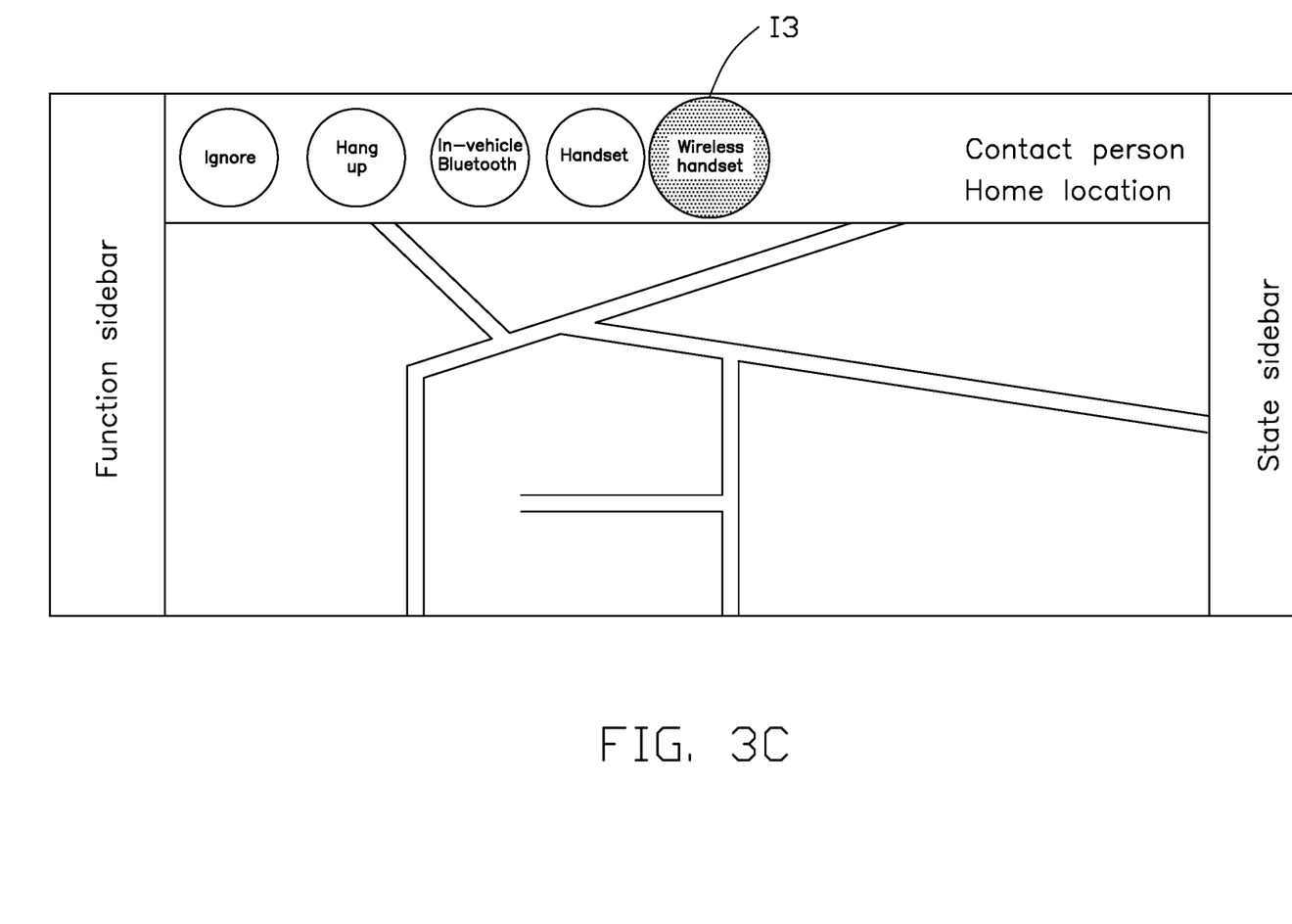
FIG. 3C is a diagram illustrating an embodiment of the display module of FIG. 2 under a third manner of call answering according to the present disclosure.

FIGS. 3A-3C show different displays of the display module 60 corresponding to the first to third manners. When the number of the persons in the vehicle detected by the detection module 20 is one and the person is sitting at the main driver seat, the icon corresponding to the first manner is displayed in the enhanced mode, such as a "in-vehicle BLUETOOTH" icon I1 (as shown in FIG. 3A).

When the number of the persons in the vehicle detected by the detection module 20 is one and the person is in a passenger seat, the icon corresponding to the second or third manner is also displayed in the enhanced mode, such as a "handset" icon I2 (as shown in FIG. 3B) of or a "wireless handset" icon I3 (as shown in FIG. 3C).

When the number of the persons in the vehicle detected by the detection module 20 is more than one, the icon corresponding to the second or third manner is displayed in the enhanced mode, such as a "handset" icon I2 (as shown in FIG. 3B) of or a "wireless handset" icon I3 (as shown in FIG. 3C).

The enhanced mode can be a zoom-in mode, a highlighted mode, or a dynamic mode, not being limited.

In some embodiments, the display module 60 can be a display screen.

The display module 60 also can be disposed in front of the main driver seat. The display module 60 also includes a "ignore" icon, a "hang-up" icon, and the like. When the "ignore" icon is pressed, the incoming call is rejected. When the "hang-up" icon is pressed, the incoming call is terminated.

The display module 60 further displays a name of the incoming call, a home location of the incoming call, a current position of the vehicle, a map, and the like. The display module 60 can also include other function icons, such as a "home" icon, volume icons, and state display icons, such as a power state and a mileage state, not limited thereto.

Figure 4:
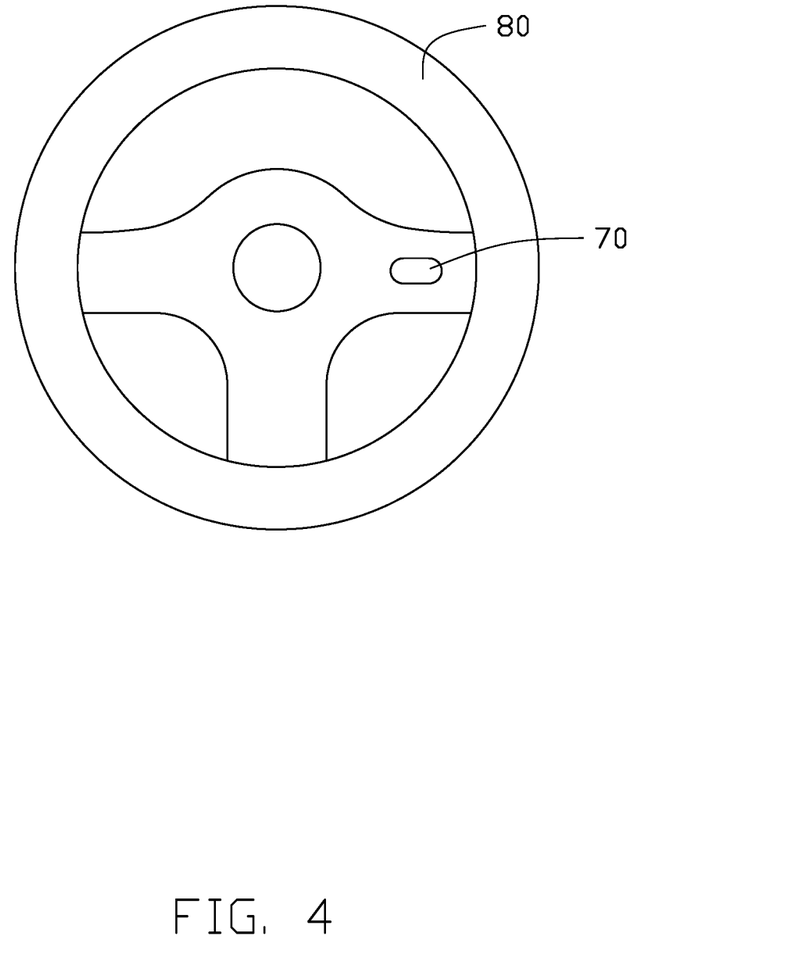
FIG. 4 is a diagram illustrating an embodiment of the switch module of FIG. 2 mounted on a steering wheel, according to the present disclosure.

As shown in FIG. 4, the vehicle-mounted system 100 further includes a switch module 70 and a steering wheel 80. The switch module 70 switches the manner among the first to third manners when activated.

The switch module 70 can be switch keys on the steering wheel 80. In some embodiments, the switch keys can be mechanical keys. The driver can press the mechanical keys on the steering wheel 80 for switching the manner of call answering, thus a safety of driving can be effectively protected. The switch module 70 also can be virtual keys displayed on the display module 60. The driver can press the virtual keys on the display module 60 for switching the manner of call answering.

The vehicle-mounted system 100 further includes a storage medium 40 and computer programs 50 stored in the storage medium 40. The processor 30 can be CPU (Central Processing Unit), and may alternatively be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, and the like. The general purpose processor may be a microprocessor, or alternatively, the processor may be any conventional processor and so on. The processor 30 can be a control center of the vehicle-mounted system 100 and uses various interfaces and circuits to connect to various parts of the vehicle-mounted system 100.

The storage medium 40 can be used to store the computer programs 50 and/or modules/units, the processor 30 implements various functions of the vehicle-mounted system 100 by performing or executing computer programs 50 and/or modules/units stored in the storage medium 40 and calling up the data stored in the storage medium 40. The storage medium 40 can mainly include an area for storing programs and an area for data storage, wherein the area for storing programs may store an operating system and at least one function desired computer programs 50 (e.g., a sound playing function, an image playing function, etc.); the area for data storage may store data (such as audio data, phone book, etc.) created according to the use of the vehicle-mounted system 100, etc. Furthermore, the storage medium 40 can include high-speed RAM (Random Access Memory), and can also include non-volatile memory, such as a hard disk, a memory, a plug-in hard disk, a SMC (Smart Memory Card), a SD (Secure Digital) card, a flash card, at least one magnetic disk storage device, a flash memory device, or other volatile solid-state storage device.

The processor 30 executes the computer programs 50 for implementing the steps of the method of automatically switching between manners, for example the blocks S1-S3.

The computer programs 50 are divided into one or more modules/units, for example an image detection unit, a person count unit, an ID detection unit, a posture detection unit, a location detection unit, a biometric identification unit, and the like. The one or more modules/units are stored in the storage medium 40 and are executed by the processor 30 to implement the present disclosure. The one or more modules/units can be a series of computer program instruction sections that are capable of performing a particular function, the instruction section is used to describe the execution of the computer programs 50 in vehicle-mounted system 100. For example, the computer programs are divided into a communication program section, a detection program section, and a process program section.

When the integrated module/unit of the vehicle-mounted system 100 is implemented in a form of a software functional unit and sold or used as an independent product, the integrated module may be stored in a computer-readable storage medium. Based on such understanding, all or parts of processes in the method in the embodiment may also be completed by virtue of relevant hardware commanded by the computer programs 50, the computer programs 50 may be stored in a computer-readable storage medium, and the steps in each embodiment of the method may be implemented when the computer programs 50 are executed by the processor 30. The computer programs include computer program codes which may be in a source code form, an object code form, an executable file form, or some intermediate forms and the like. The computer-readable storage medium may include any one of an entity or apparatus, a recording medium, a U disk, a mobile hard disk, a diskette, an optical disk, a computer memory, a read-only memory (ROM), a random-access memory (RAM), an electric carrier signal, a telecommunication signal, a software distribution medium, and the like capable of carrying the computer program codes. It should be explained that the content included by the computer-readable storage medium may be appropriately increased or reduced according to the requirements of legislation and patent practices in jurisdictions, for example, the computer-readable storage medium does not include the electric carrier signal and the telecommunication signal according to the legislation and patent practices in some jurisdictions.

In addition, function modules in the embodiments of the present invention may be integrated into a processing module, or each of the modules may exist alone physically, or two or more modules can be integrated into a module. The integrated module may be implemented in a form of hardware, or may be implemented in a form of a software functional unit.

For the purposes of the technical personnel in the field, it is clear that the invention is not limited to the details of the above-mentioned exemplary embodiment, without departing from the spirit of the invention and the basic characteristics of or, in other specific form capable of realizing the invention. Therefore, no matter from which point of view, the embodiment should be viewed as exemplary, and not restrictive, the scope of this invention by the attached claims is not limited to the above-mentioned description. The claims are thus aimed at equivalent elements of all changes within the meaning and scope of the claims in this invention. None of the claims should be regarded as limiting the claims. Furthermore, the term "comprising" does not exclude other unit clear or steps, and singular does not exclude a plurality. The system rights of the plurality of units or device in statements can also be made from a unit or device which is realized by software or hardware. 1st, $2^{nd}$, $3^{rd}$ and other terms are used only to name, and do not mean that any particular order should apply.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of automatically switching manners of call answering in a vehicle-mounted system; the vehicle-mounted system comprises a storage medium with computer programs and a processor; the processor executes computer programs in the storage medium to implement the following steps:
   (a) connecting with a terminal device;
   (b) detecting state information of persons in a vehicle; the persons can comprise a driver and passengers; and
   (c) recommending one of a first manner, a second manner, and a third manner for answering an incoming call received by the connected terminal device based on the state information of the persons.

2. The method of claim 1, wherein the state information comprises a number of persons; the step (c) comprises:
   recommending the first manner when the number of persons is one; and
   recommending the second or third manner when the number of persons is more than one.

3. The method of claim 1, wherein the step (c) comprises:
   recommending the first manner when the number of persons is one and a main driver seat is determined to be occupied; and
   recommending the second or third manner when the number of persons is one and a passenger seat is determined to be occupied.

4. The method of claim 1, wherein the first manner is an in-vehicle BLUETOOTH manner, the second manner is a wired headset manner, and the third manner is a wireless headset manner.

5. The method of claim 4, wherein when the third manner is selected, the terminal device answers the incoming call in a wireless manner.

6. The method of claim 1, before the step (a), the method further comprising:
   detecting a facial image of a driver; and
   connecting with the terminal device corresponding to the facial image.

7. The method of claim 1, wherein the state information comprises image information of persons in the vehicle, and/or infrared information of persons in the vehicle, and/or information of safety belt put on by persons in the vehicle, and/or information of pressures on seats of the vehicle.

8. A vehicle-mounted system comprises:
   a storage medium with computer programs; and
   a processor; the processor executes computer programs in the storage medium to implement the following steps:
   (a) connecting with a terminal device;
   (b) detecting state information of persons in a vehicle; the persons can comprise a driver and passengers; and
   (c) recommending one of a first manner, a second manner, and a third manner for answering an incoming call received by the connected terminal device based on the state information of the persons.

9. The vehicle-mounted system of claim 8, wherein the processor further:
   recommending the first manner when the number of persons is one; and
   recommending the second or third manner when the number of persons is more than one.

10. The vehicle-mounted system of claim 8, wherein the processor further:
    recommending the first manner when the number of persons is one and a main driver seat is determined to be occupied; and recommending the second or third manner when the number of persons is one and a passenger seat is determined to be occupied.

11. The vehicle-mounted system of claim 8, wherein the first manner is an in-vehicle BLUETOOTH manner, the second manner is a wired headset manner, and the third manner is a wireless headset manner.

12. The vehicle-mounted system of claim 11, wherein when the third manner is selected, the terminal device answers the incoming call in a wireless manner.

13. The vehicle-mounted system of claim 8, wherein the processor further:
  detecting a facial image of a driver; and
  connecting with the terminal device corresponding to the facial image.

14. The vehicle-mounted system of claim 8, wherein the state information comprises image information of persons in the vehicle, and/or infrared information of persons in the vehicle, and/or information of safety belts put on by the persons in the vehicle, and/or information of pressures on the seats of the vehicle.

15. The vehicle-mounted system of claim 8, wherein the vehicle-mounted system further comprises a display module; the display module displays icons corresponding to the first to third manners; when one of the first to third manners is selected, the corresponding icon is displayed in an enhanced mode for being different from other icons.

16. The vehicle apparatus of claim 8, wherein the vehicle-mounted system further comprises a switch module; the switch module switches among the first to third manners when being activated.

17. The vehicle-mounted system of claim 16, wherein the switch module is mounted on a steering wheel of the vehicle.

18. The vehicle-mounted system of claim 16, wherein the switch module is virtual keys displayed in a display module of the vehicle-mounted system.

\* \* \* \* \*